(12) United States Patent
Schray

(10) Patent No.: US 7,068,907 B2
(45) Date of Patent: Jun. 27, 2006

(54) OPTICAL FIBER ENCLOSURE SYSTEM

(75) Inventor: Steven John Schray, Princeton, MA (US)

(73) Assignee: Fiber Optic Network Solutions, Corp., Northborough, MA (US)

( * ) Notice: Subject to any disclaimer, the term of this patent is extended or adjusted under 35 U.S.C. 154(b) by 0 days.

(21) Appl. No.: 11/007,673

(22) Filed: Dec. 8, 2004

(65) Prior Publication Data

US 2005/0100302 A1     May 12, 2005

Related U.S. Application Data

(63) Continuation of application No. 10/074,267, filed on Feb. 12, 2002, now Pat. No. 6,845,207.

(60) Provisional application No. 60/268,234, filed on Feb. 12, 2001, provisional application No. 60/272,993, filed on Mar. 2, 2001.

(51) Int. Cl.
    *G02B 6/00*        (2006.01)
(52) U.S. Cl. .................................................. 385/135
(58) Field of Classification Search ................ 385/134, 385/135
See application file for complete search history.

(56) References Cited

U.S. PATENT DOCUMENTS

| | | | |
|---|---|---|---|
| 4,898,448 A | 2/1990 | Cooper | 350/96.2 |
| 4,900,123 A | 2/1990 | Barlow et al. | 350/96.2 |
| 5,093,885 A * | 3/1992 | Anton | 385/134 |
| 5,100,221 A | 3/1992 | Carney et al. | 385/135 |
| 5,212,761 A | 5/1993 | Petrunia | 385/135 |
| 5,231,687 A | 7/1993 | Handley | 385/139 |
| 5,289,558 A * | 2/1994 | Teichler et al. | 385/135 |
| 5,402,515 A | 3/1995 | Vidacovich et al. | 385/135 |
| 5,497,444 A | 3/1996 | Wheeler | 385/135 |
| 5,613,030 A | 3/1997 | Hoffer et al. | 385/135 |
| 5,708,751 A * | 1/1998 | Mattei | 385/135 |
| 5,825,964 A * | 10/1998 | Goetter et al. | 385/135 |
| 6,009,225 A | 12/1999 | Ray et al. | 385/135 |
| 6,250,816 B1 | 6/2001 | Johnston et al. | 385/53 |
| 6,363,198 B1 | 3/2002 | Braga et al. | 385/134 |
| 6,385,381 B1 | 5/2002 | Janus et al. | 385/135 |
| 6,539,160 B1 * | 3/2003 | Battey et al. | 385/135 |
| 6,542,688 B1 | 4/2003 | Battey et al. | 385/135 |
| 6,845,207 B1 * | 1/2005 | Schray | 385/135 |

* cited by examiner

*Primary Examiner*—Edward J. Glick
*Assistant Examiner*—Thomas R. Artman
(74) *Attorney, Agent, or Firm*—Merchant&Gould PC

(57) ABSTRACT

An optical fiber enclosure system includes a plurality of optical fiber cassettes and a splice module. The enclosure provides improved access and control of optical fiber management. The optical fiber cassette includes adapters, fiber optic connectors, front face, side wall, rear face, fanout devices and ribbon pigtails. The adapters are mounted to the front face of the cassette. The side wall is attached between the front face and the rear face to provide space for optical fiber management. The fanout devices are mounted to the rear face of the cassette and provide fanout of the ribbon pigtails to individual optical fibers that terminate at the fiber optic connectors. The fiber optic connectors are coupled to the adapters at the front face of the cassette. The splice module includes a management plate and a hingedly joined splice door. The splice door can include a removable splice tray for mounting optical fiber splices and for managing associated slack fiber loops around the splices.

13 Claims, 21 Drawing Sheets

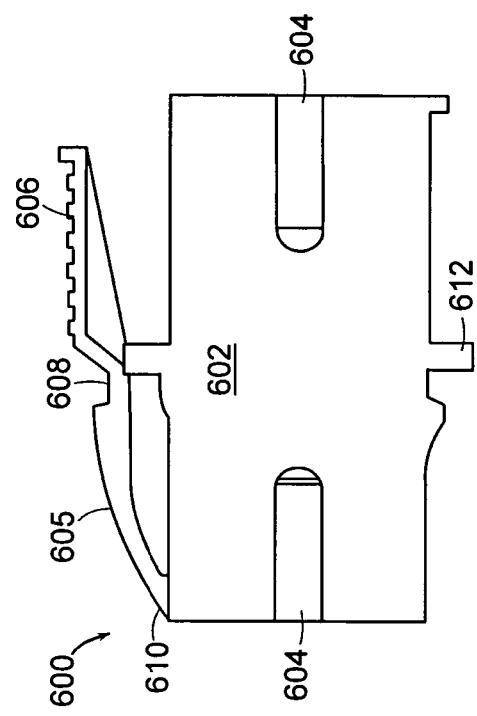
FIG. 37B
FIG. 37A
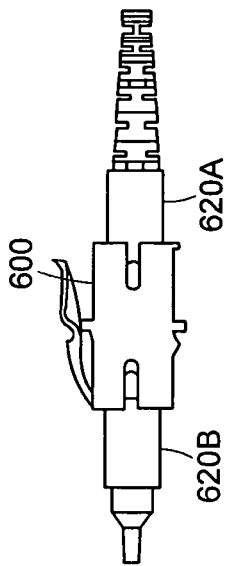
FIG. 38B
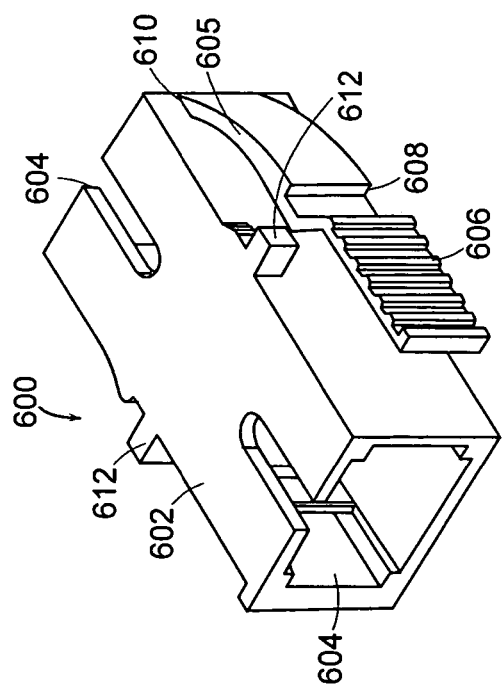
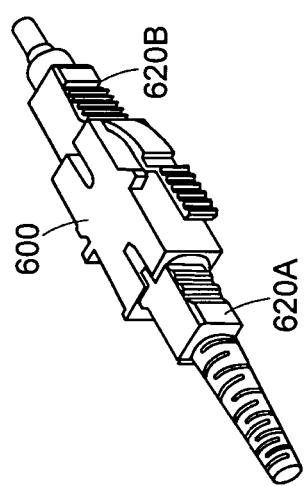
FIG. 38A

OPTICAL FIBER ENCLOSURE SYSTEM

CROSS REFERENCES TO RELATED APPLICATIONS

This application is a continuation application of U.S. Ser. No. 10/074,267, filed Feb. 12, 2002, now U.S. Pat. No. 6,845,207 which claims the benefit of the U.S. Provisional Patent Application No. 60/268,234 filed Feb. 12, 2001, and of U.S. Provisional Patent Application No. 60/272,993, filed Mar. 2, 2001. The entire contents of the above applications are incorporated herein by reference.

BACKGROUND OF THE INVENTION

With the growth of fiber optic communication systems, numerous devices have been developed to house and manage the complex assemblies needed.

One such system is known as an optical fiber cross-connect enclosure. Standard enclosures include a sheet metal housing with removable hinged front and rear doors. For fiber optic patching applications, a removable hinged bulkhead divides the housing into a front and rear compartment with the rear compartment typically being deeper than the front. Removable panels, which contain various numbers of fiber optic adapters, are mounted to the bulkhead. In a typical application, fiber optic jumpers are routed to the front and rear compartments for patching. Front access to the front compartment is provided through ports at the bottom of both sides with routing rings positioned along a front management plate mounted to the bottom of the housing. Bend radius guides are usually mounted to the housing to prevent sharp bends in the fiber as it enters the enclosure. Rear access to the rear compartment is provided through ports at the bottom of both sides with routing rings positioned along a rear management plate mounted to the bottom of the housing. Accommodations for ribbon fanout blocks are also common when the ribbon needs to be individually connectorized. For splicing applications, similar housings without the bulkhead are used. Various types of splice holders and management methods are used by different manufactures.

There remains a Continuing need for improvements to lower cost, increase efficiency, capacity and density and provide for ease of maintenance with optical fiber enclosures.

SUMMARY OF THE INVENTION

The present invention relates to improvements in fiber enclosure systems providing more efficient optical fiber management and maintenance. A fiber enclosure having a plurality of optical fiber cassettes and a splice module provides improved access and control of optical fiber management. The fiber enclosure provides increased patch and splice capacity and density.

The optical fiber cassette includes adapters, fiber optic connectors, front face, side wall, rear face, fanout devices and ribbon pigtails. The adapters are mounted to the front face of the cassette. The side wall is attached between the front face and the rear face to provide space for optical fiber management. The fanout devices are mounted to the rear face of the cassette and provide fanout of the ribbon pigtails to individual optical fibers that terminate at the fiber optic connectors. The fiber optic connectors are coupled to the adapters at the front face of the cassette.

The splice module includes a management plate and a hingedly joined splice door. The splice door can include a removable splice tray for mounting optical fiber splices and for managing associated slack fiber loops around the splices.

According to another aspect, a fiber radius guide adapted for reversible mounting to a fiber enclosure uses snap-on engagement.

A removable fiber optic adapter includes a body and at least one engagement member.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 37A and 37B illustrate perspective and plan views, respectively, of a first embodiment of a removable adapter.

FIGS. 38A and 38B illustrate perspective and plan views, respectively, of the removable adapter of FIGS. 37A, 37B having pigtail connectors engaged with the adapter.

DETAILED DESCRIPTION OF THE INVENTION

The present system provides a fiber optic cross-connect enclosure which can accommodate a variety of quantities of fiber optic cross-connect patches and splices. The present system builds on the known standard enclosures by increasing patch and splice capacity and incorporating other improvements.

Figure 1:
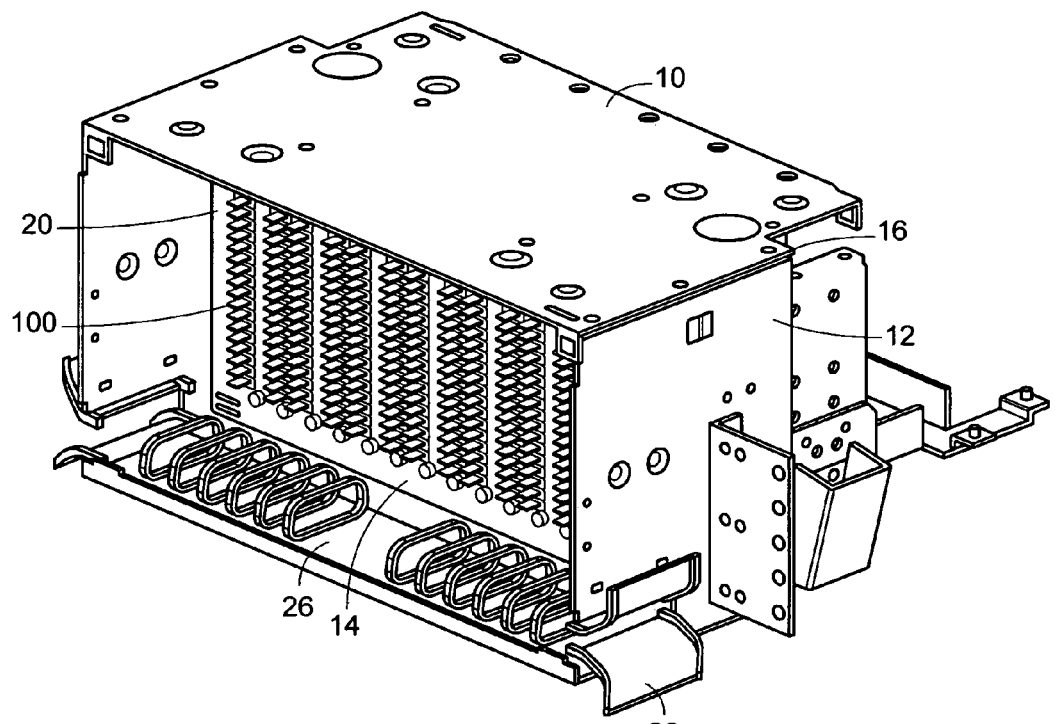
FIG. 1 is a front perspective view of an embodiment of an optical fiber enclosure.
Figure 2:
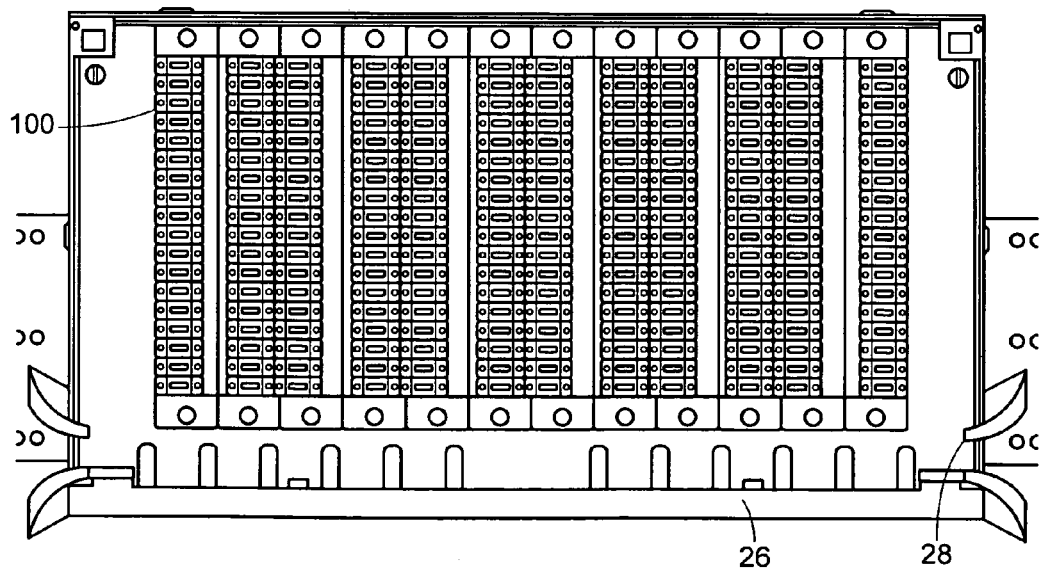
FIG. 2 is a front view of the enclosure of FIG. 1.
Figure 3:
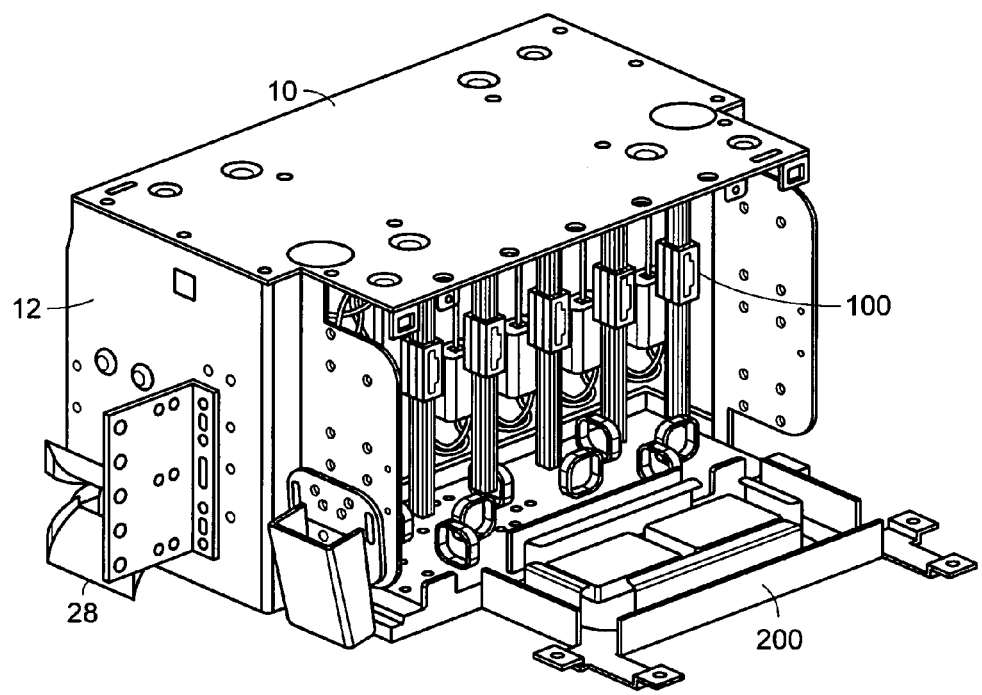
FIG. 3 is a rear perspective view of the enclosure of FIG. 1.
Figure 4:
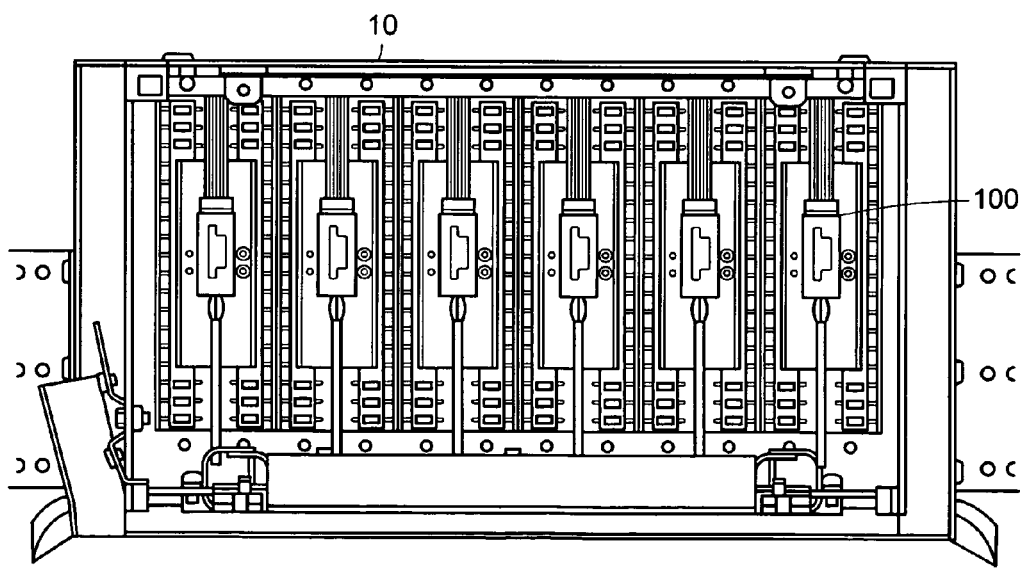
FIG. 4 is a rear view of the enclosure of FIG. 1.
Figure 5:
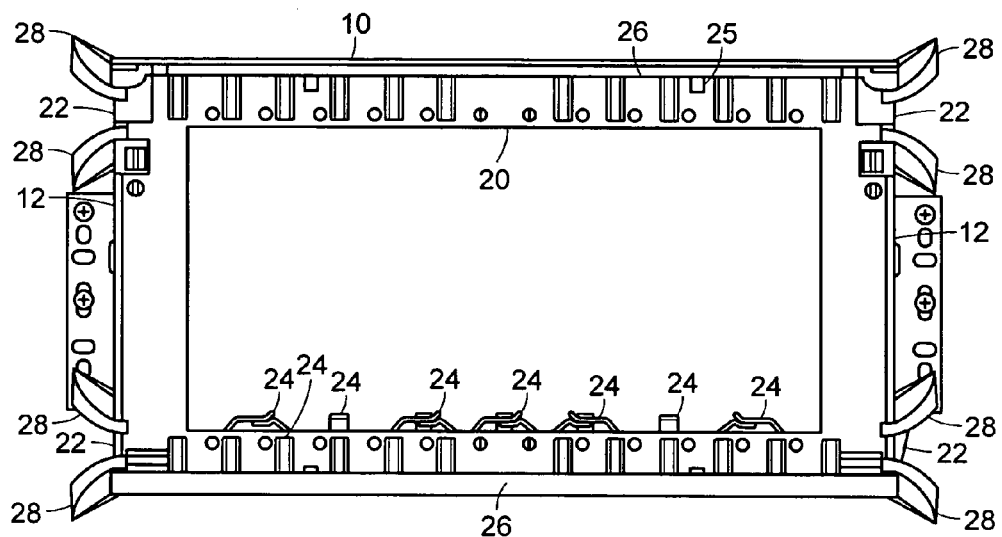
FIG. 5 is a front view of the enclosure of FIG. 1 with optical fiber cassettes removed.

FIGS. 1–5 illustrate an embodiment of an optical fiber enclosure. FIG. 1 is a front perspective view of the enclosure. The enclosure includes a housing 10 with sides 12 and front and rear compartments 14, 16 respectively, a bulkhead 20 and a splice module 200. Mounted to the bulkhead are optical fiber cassettes 100. FIG. 2 is a front view of the enclosure. FIG. 3 is a rear perspective view of the enclosure. FIG. 4 is a rear view of the enclosure. FIG. 5 is a front view of the enclosure with the optical fiber cassettes removed.

Figure 6:
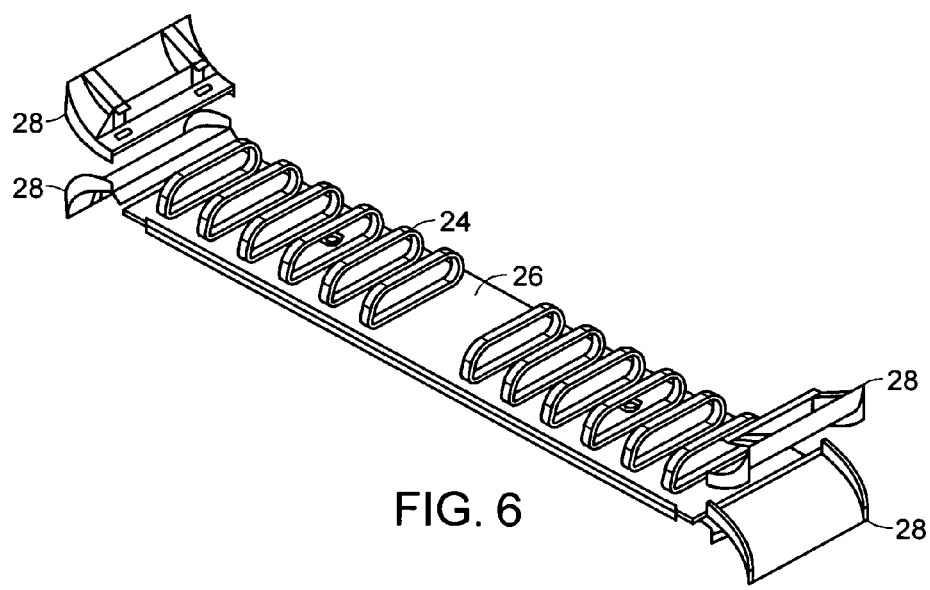
FIG. 6 is a perspective view of a front management plate in accordance with a preferred embodiment of the present invention.

The enclosure includes a sheet metal housing 10 with removable hinged front and rear doors. For fiber optic patching applications, a removable hinged bulkhead 20 divides the housing into a front and rear compartment with the rear compartment being deeper than the front. Removable panels, which contain various numbers of fiber optic adapters, are mounted to the bulkhead 10. In a typical application, fiber optic jumpers are routed to the front compartment for patching. Front access to the front compartment is through ports 22 at the top and bottom of both sides 12 with routing rings 24 positioned along a front management plate 26 mounted to the bottom of the housing 10 using nylatches 25 as shown in FIGS. 5 and 6. Front fiber management is improved by adding the ports at the top of each side with the ability to mount an additional front management plate 26 at the top of the housing 10. This feature can be used to accommodate applications in which the number of jumpers entering the enclosure is too great for the bottom ports alone. As noted above, current designs allow for management only on the bottom of an enclosure. Fiber radius guides 28, described further herein, are mounted to the housing to prevent sharp bends in the fiber as it enters the enclosure.

Figure 7A:
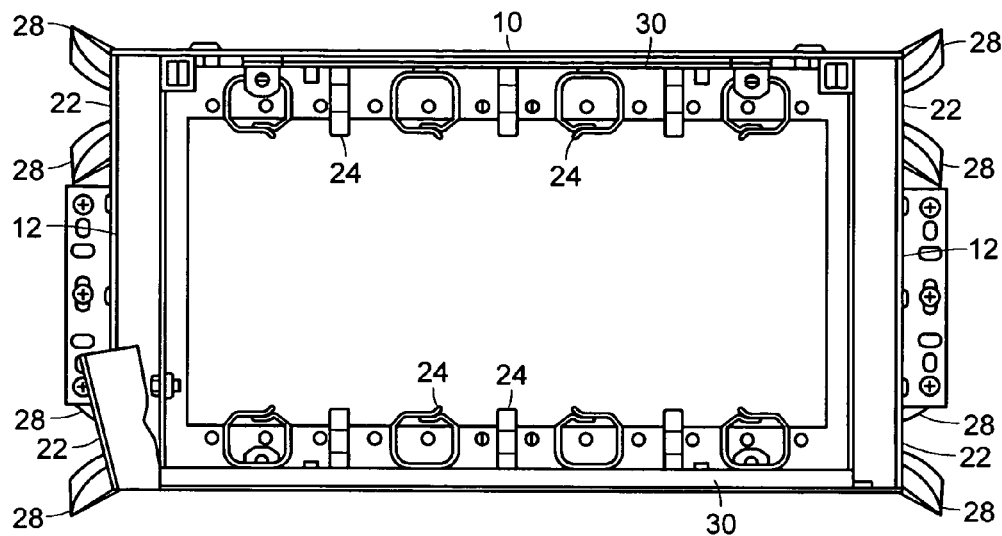
FIG. 7A is a rear view of the enclosure of FIG. 1 with optical fiber cassettes removed.
Figure 7B:
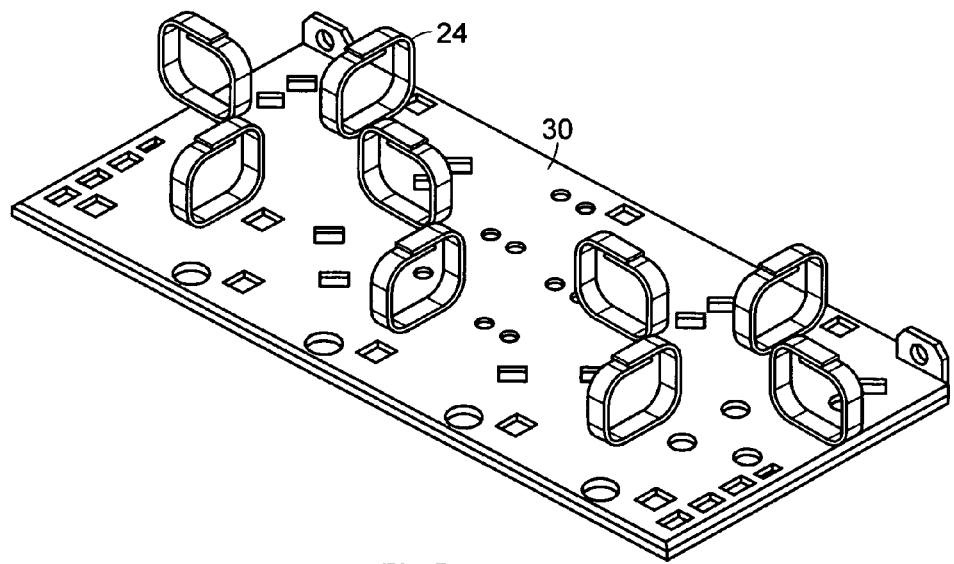
FIG. 7B is a perspective view of a rear, management plate in accordance with a preferred embodiment of the present invention.

In a typical application, fiber optic jumpers or bundled cable is routed to the rear compartment for patching. Rear access to the rear compartment is through ports 22 at the bottom and top of both sides with routing rings 24 positioned along a rear management plate 30 mounted to the top and bottom of the housing as shown in FIGS. 7A and 7B. Similar to the front fiber management, the rear fiber management is improved by providing the capability to mount the rear management plate 30 to the top of the enclosure to accommodate applications in which the number of fibers to be managed is too great for the bottom plate alone.

Figure 8A:
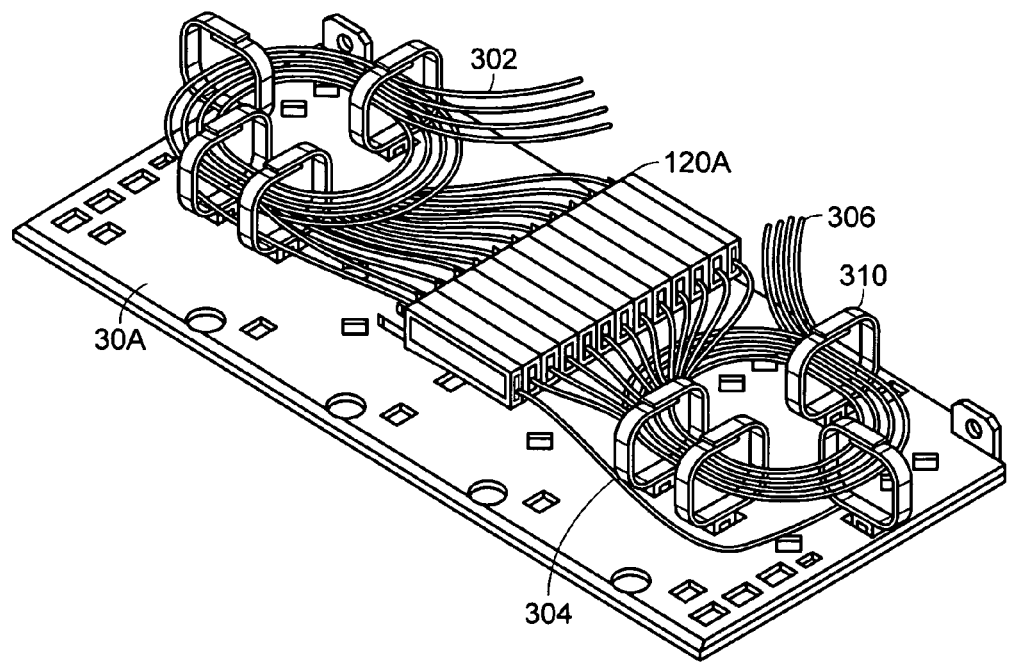
FIGS. 8A and 8B are perspective and front views, respectively, of a rear management plate with ribbon fanout devices mounted thereto in accordance with a preferred embodiment of the present invention.
Figure 8B:
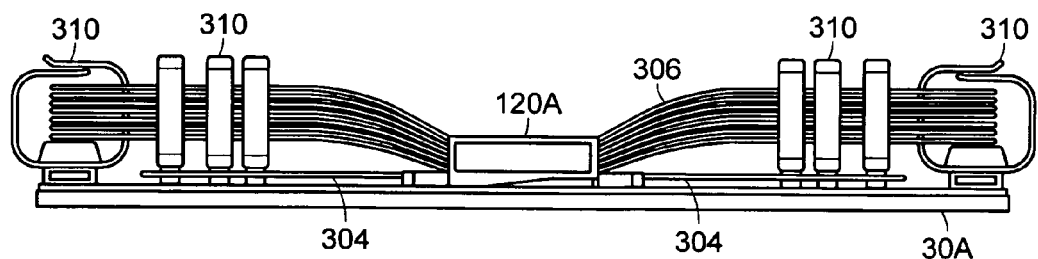

Referring now to FIGS. 8A and 8B, an improvement to the rear fiber management system is shown in which ribbon fanout devices 120A are mounted onto rear management plate 30A for fanning out individual fibers 302, 306 from ribbon cables 304 for routing management through saddles 310. This improvement is useful particularly in system applications in which ribbon cable 304 is required to be brought into the rear of the optical fiber enclosure or in which mass fusion splicing is done in the rear of the enclosure. The ribbon fanout devices 120A are each mounted orthogonal to the plane of the rear management plate. The ribbon fanout devices 120A are mounted in alternating directions for routing the exiting the fibers evenly to the left and right of the center mounting area.

Figure 8C:
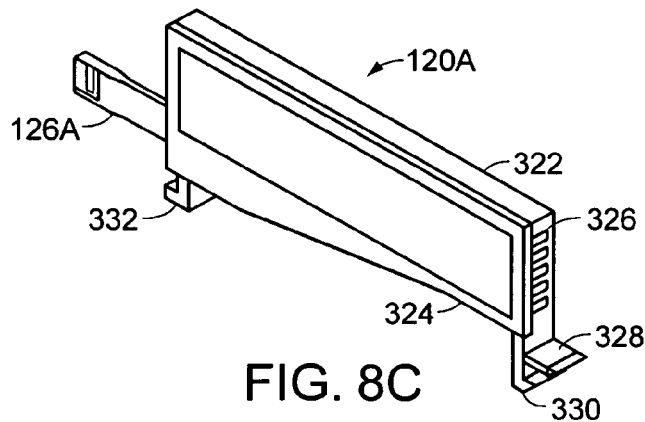
FIG. 8C is a perspective view of a ribbon fanout device in accordance with a preferred embodiment of the present invention.
Figure 8D:
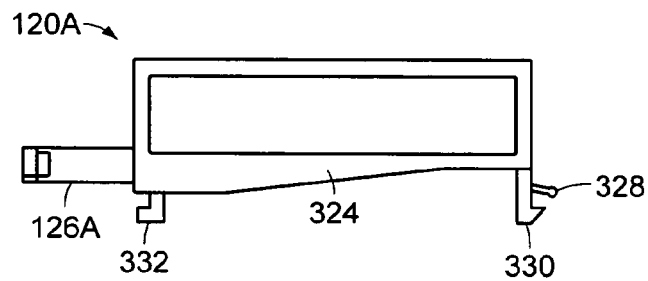
FIG. 8D is a plan view of the ribbon fanout device in accordance with a preferred embodiment of the present invention.
Figure 8E:
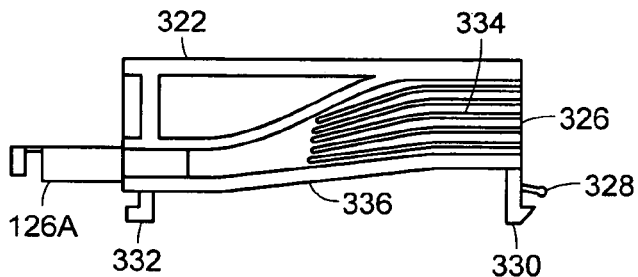
FIG. 8E is a plan view of the ribbon fanout device with the cover removed in accordance with a preferred embodiment of the present invention.
Figure 8F:
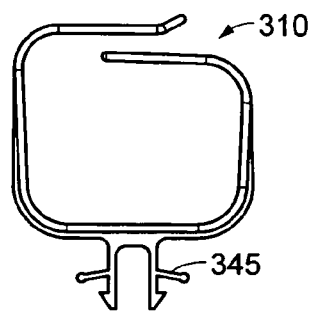
FIG. 8F is a plan view of a fiber saddle device in accordance with a preferred embodiment of the present invention.
Figure 9:
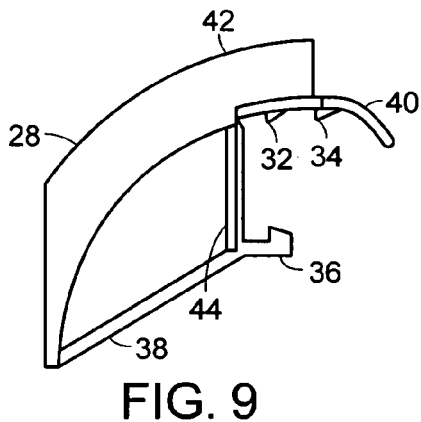
FIG. 9 is a side view of a fiber radius guide adapted for mounting to the enclosure of FIG. 1.
Figure 10:
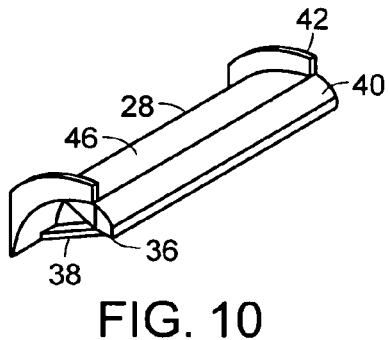
FIG. 10 is a top perspective view of the fiber radius guide of FIG. 9.
Figure 11:
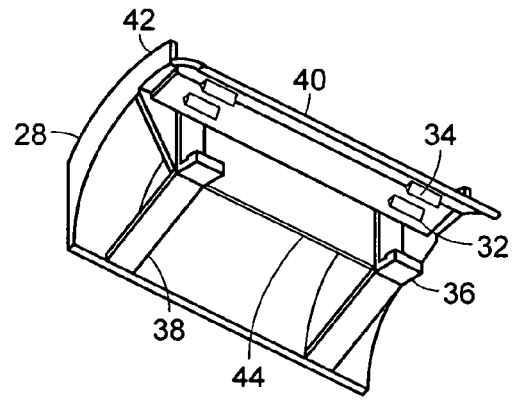
FIG. 11 is a bottom perspective view of the fiber radius guide of FIG. 9.
Figure 12:
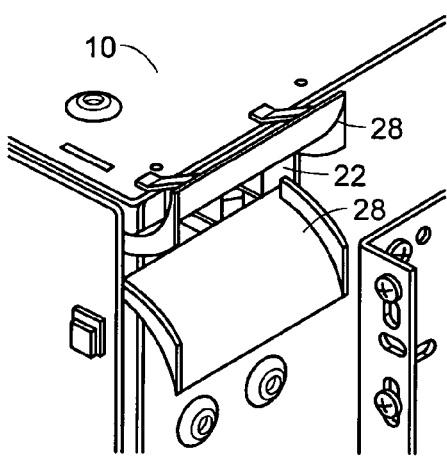
FIG. 12 is a top perspective view showing the fiber radius guide of FIG. 9 mounted to an upper portion of the enclosure of FIG. 1.
Figure 13:
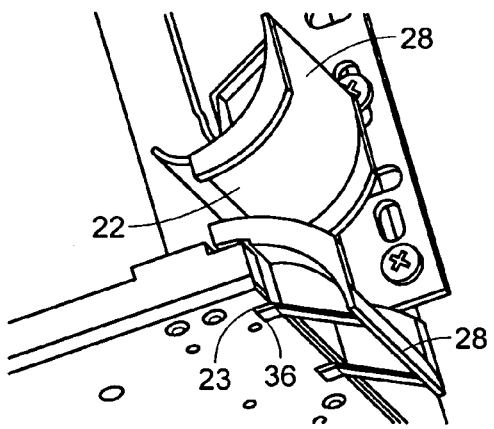
FIG. 13 is a bottom perspective view showing the fiber radius guide of FIG. 9 mounted to a lower portion of the enclosure of FIG. 1.

FIGS. 8C–8E show the ribbon fanout device 120A which includes a body 322 and a removable cover 324. Mounting to the management plate is facilitated by tabs 328, 330, 332 that snap into the plate. The fanout device also includes a ribbon cable termination 126A that is offset from a longitudinal axis of the device and relative to the individual fibers that exit the fanout device at exit ports 326. The fanout device further includes a fiber fanout section 334 that fans out the bundle of individual fibers in the ribbon cable to the exit ports 326. In this device, the angled contour 336 of the body 322 serves to elevate the individual fibers from the rear management plate to provide space for the ribbon cable to be routed below. To further facilitate routing of the fibers, a fiber saddle 310 (FIG. 8F) is provided which has tabs 345 for mounting to the plate. The fiber saddle 310 also elevates the individual fibers from the rear management plate to provide space for the ribbon cable to be routed below.

Thus it can be seen that the mounting orientation and cable offset facilitates looping of the ribbon cable underneath the fanout devices. This provides a layered fiber management with the ribbon cable located close to the surface of the rear management plate and the individual fibers managed above the ribbon cable.

Referring now to FIGS. 9 to 15, the fiber radius guide 28 is there shown. The guide 28 is a reversible, snap-on, plastic fiber radius guide adapted for mounting above and below each port 22 (FIGS. 5 and 7) to prevent any tight bends as the fiber enters the enclosure. A reversible guide reduces the number of parts inventoried and provides equal protection of the fibers whether they are routed from below or above the enclosure. The snap-on feature prevents the guides from falling off as they are exposed to moisture or age.

The guide 28 includes curved body 46 and a hood 40. A pair of first supports 38 extends from one end of curved body 46 and intersects a second support member 44 that extends from the other end of curved body 46. A pair of hooks 36 extend from the point at which the first and second members intersect. The hood 40 includes two pairs of barbs 32, 34 which oppose the pair of hooks 36.

When used to attach to the top or bottom of the enclosure, the hooks 36 engage slots in the top or bottom of the housing 10 and barbs 34 engage slots in the front or rear management plate. When used to attach to sides of the enclosure, the hooks 36 engage slots in the side and barbs 32 engage edges of cutouts in the housing as shown in FIGS. 12–15. The guide is symmetric for use on both left and right sides of the enclosure.

Figure 14:
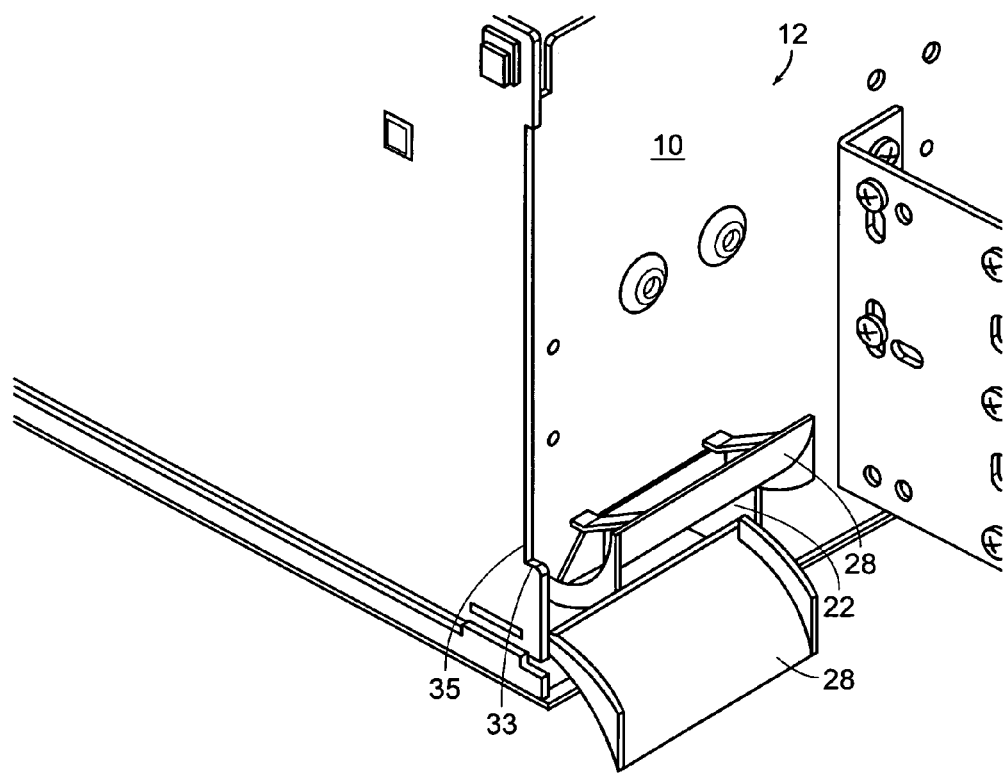
FIG. 14 is a top perspective view showing the fiber radius guide of FIG. 9 mounted to a lower portion of the enclosure of FIG. 1.
Figure 15:
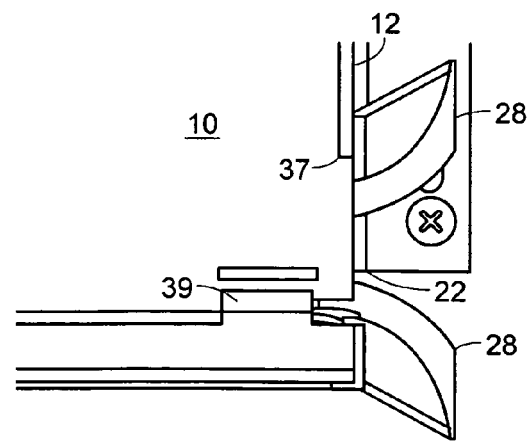
FIG. 15 is a side view showing the fiber radius guide of FIG. 9 mounted to a lower portion of the enclosure of FIG. 1.

Referring to FIGS. 14 and 15, improvements are now described that make the housing stronger and less likely to become damaged when the enclosure is dropped. Because the sides 12 are cut out to allow fiber ports, the housing is weakened. This can cause the door latches to break and the hinges to bend when the enclosure is dropped because the weak housing is relying on the latches and hinges for strength. The housing is strengthened by using notches 37 at the edges of the front and back door and bringing the sides 12 of the housing through the notches. This transfers forces between the sides and doors and lessens the forces being transmitted though the latches and hinges. Engagement areas 33, 35 are shown in FIG. 14. In addition, the hinges 39 are buttressed by bringing material directly underneath them to prevent them from bending.

Figure 16B:
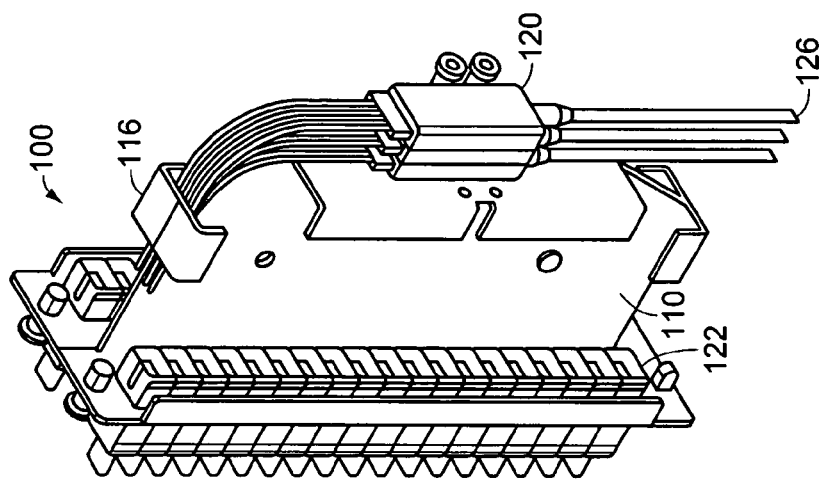
FIG. 16B is a rear perspective view of the optical fiber cassette in accordance with a preferred embodiment of the present invention.
Figure 16A:
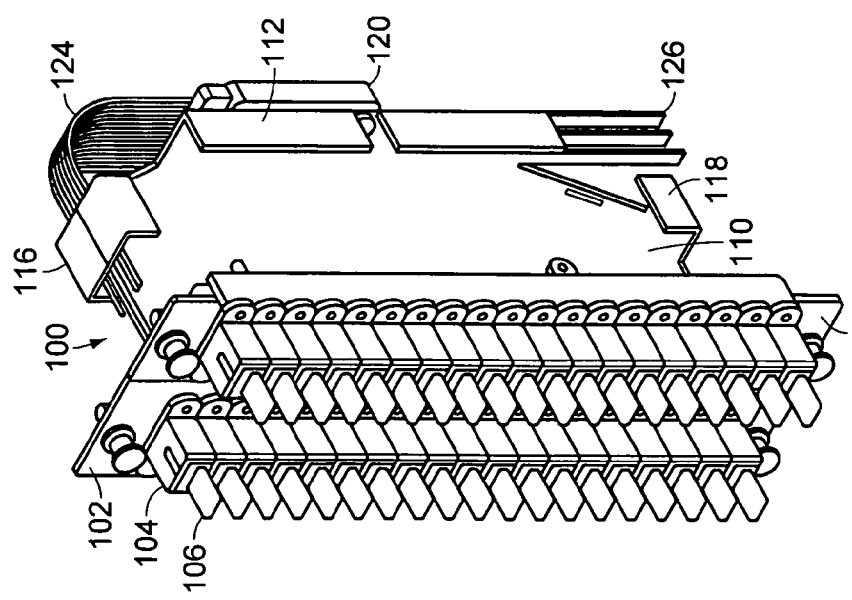
FIG. 16A is a front perspective view of an embodiment of an optical fiber cassette.

Referring now to FIGS. 16A and 16B, an embodiment of the optical fiber cassette 100 is shown. The optical fiber cassettes provide a way to pre-manage fiber optic pigtails to make the assembly more modular and allow manufacturing to be split up in stages.

In standard enclosures, fiber optic adapters are mounted to patch panels in groups from 6 to 24. The patch panels are then mounted to the bulkhead as noted in the background. Fiber optic jumpers are routed to the front of the adapters and fiber optic pigtails or terminated fiber optic cables are routed to the rear of the adapters. When large count fiber optic cable is used, the fiber is usually in the form of 12 fiber ribbon. For these ribbons to be terminated individually, the ribbons must be fanned out. There are currently many different fanout devices available. Typically, these fanout devices are mounted to the housing, usually on the bottom attached to the rear fiber management kit. Individual fibers are then routed from the fanout devices to the rear of the adapters. This "pre-wiring" of the enclosure is time consuming and must be done after the cable has been fanned out and connectorized.

To allow for separation of the stages of manufacture, an optical fiber cassette 100 is provided. The cassette 100 includes adapters 104, adapter plugs 106, fiber optic connectors 122, front face panel 102, side wall 110, rear face 112, fanout device 120 and ribbon pigtail 126. The cassette also includes keys 116, 118 for mounting the cassette to the bulkhead.

The adapters are mounted to the front face of the cassette. The side wall is attached between the front face and the rear face to provide space for optical fiber management. One or more fanout devices 120 are mounted to the rear face of the cassette and provide fanout of the ribbon pigtails 126 to individual optical fibers 124 that terminate at the fiber optic connectors. The fiber optic connectors are coupled to the adapters at the front face of the cassette. The space behind the adapters is used for optical fiber management. This area can be divided into layers and compartments for additional management of the fibers. The fiber management in the cassette is critical as the fibers can not be over bent.

The embodiment shown in FIGS. 16A and 16B is a double width device having two front face panels 102. Alternate embodiments of the cassette can have a single front face panel.

The cassettes can be assembled separately and used as needed when an enclosure needs a specific cable attached to it. The cassettes have built in fiber management to allow for ease of assembly and reduction in fiber breakage. Mounting of the fanout devices to the patch panels and managing the fiber between the fanout block and the adapters provides an integrated assembly.

The embodiment shown in FIGS. 16A and 16B is referred to as a closed cassette and provides fiber management in a predetermined route. This embodiment is useful for handling varying terminated fiber lengths due to manufacturing yields.

Figure 17B:
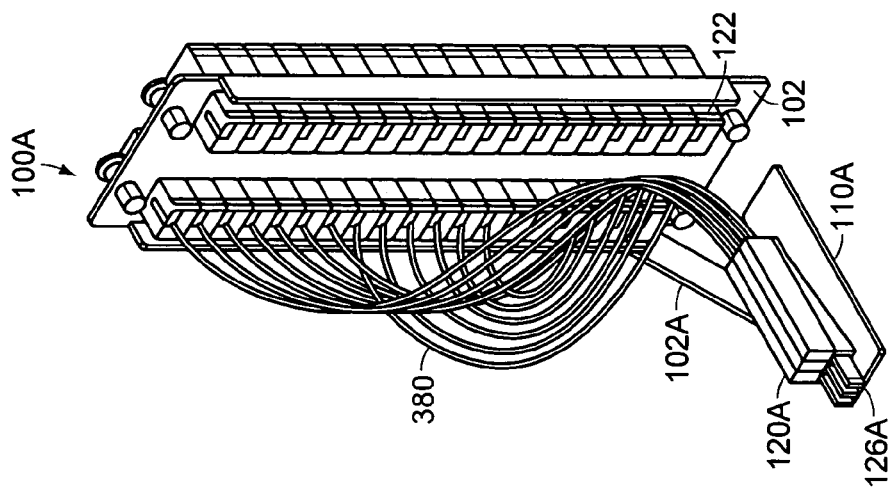
FIG. 17B is a rear perspective view of the optical fiber cassette in accordance with the embodiment illustrated in FIG. 17A.
Figure 17A:
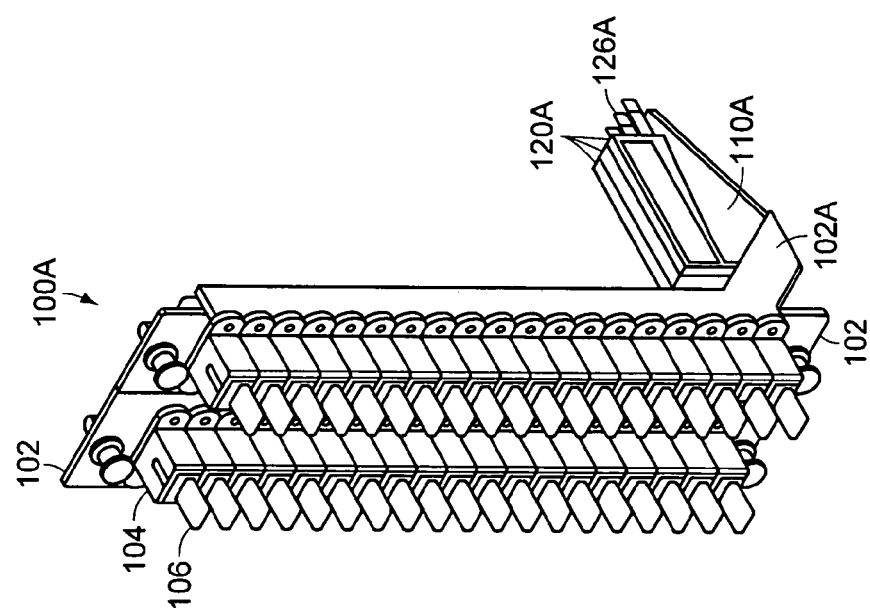
FIG. 17A is a front perspective view of a second embodiment of an optical fiber cassette.

Typically, the connectors 122 need to be available for routine cleaning and inspection. Access to the rear connectors is important since the fibers are managed behind the adapters 104. A second embodiment of a cassette 100A that provides improved access to the connectors is referred to herein as an open cassette and is shown in FIGS. 17A and 17B. In this embodiment, the fanout devices 120A are mounted in close proximity to the front of the cassette or directly to the front panel 102. The fibers 380 between the fanout devices 120A and the connectors are left floating or are managed minimally while still allowing access and removal from the rear of the cassette.

The cassette 100A includes adapters 104, adapter plugs 106, fiber optic connectors 122, front face panel 102, mounting plate 100A, panel arm 102A and fanout devices 120A.

The adapters are mounted to the front face of the cassette. The panel arm 102A extends from the panel and is attached to mounting plate 100A. One or more fanout devices 120A are mounted on the mounting plate 100A and provide fanout of ribbon cables to individual optical fibers 380 that terminate at the fiber optic connectors. The fiber optic connectors are coupled to the adapters at the front face of the cassette. The space behind the adapters is used for optical fiber management.

Figure 20:
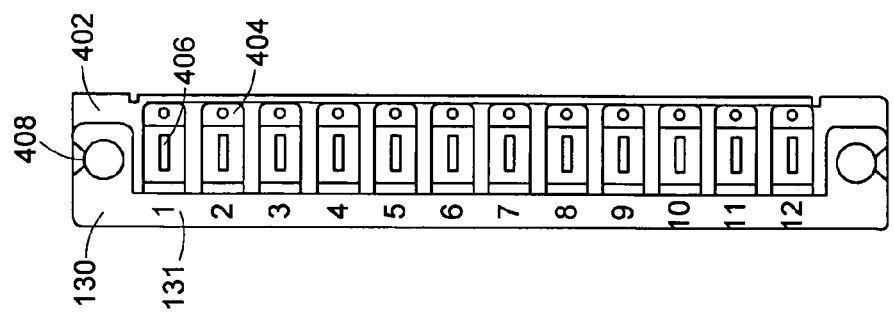
FIG. 20 is a front view of the adapter panel with the mounted assignment tab in accordance with a preferred embodiment of the present invention.
Figure 19:
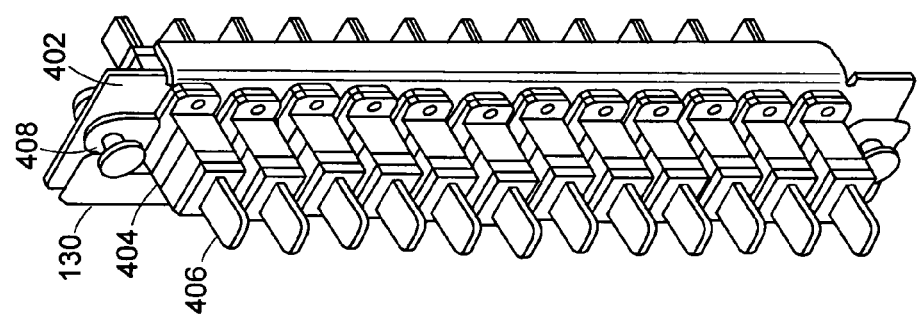
FIG. 19 is a perspective view of an adapter panel with the assignment tab of FIG. 18 mounted thereto.
Figure 18:
FIG. 18 is a perspective view of an assignment tab in accordance with a preferred embodiment of the present invention.
Figure 22:
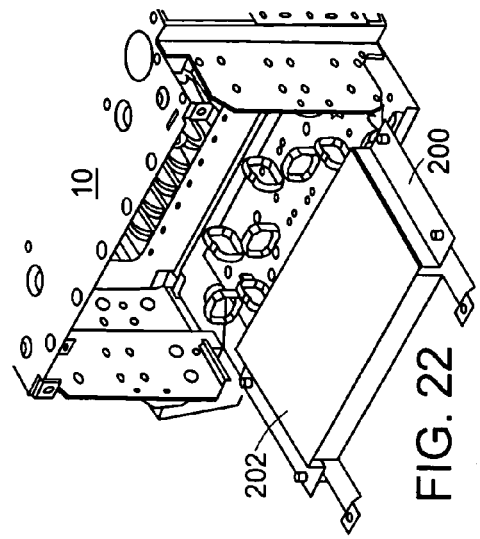
FIG. 22 is a rear perspective view of the enclosure of FIG. 1 with the fold down splice module in the opened position.
Figure 24:
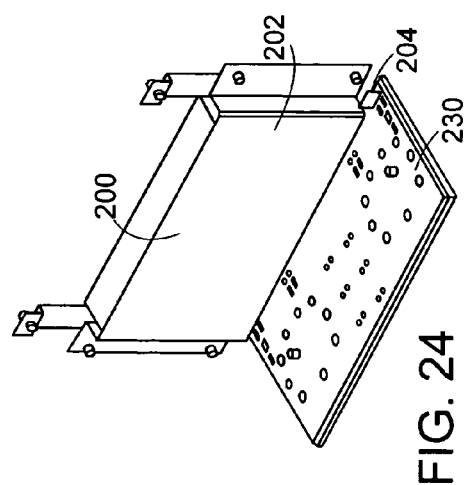
FIG. 24 is a front perspective view of the fold down splice module in the closed position.

Referring to FIGS. 18–20, an improvement to the labeling of adapters for location tracking purposes is now described. FIG. 18 shows an assignment tab 130. FIGS. 19 and 20 show the assignment tab 130 attached to an adapter panel 402 which includes adapters 404 and plugs 406. It should be noted that the assignment tab also can be used with the cassettes described above (FIGS. 16–17).

The assignment tab 130 includes openings 133 which can be secured or fitted around nylatches 408 located at the top and bottom of the adapter panel. By adding a removable assignment tab 130, it becomes easier to label, read and relabel the adapter locations. Adhesive labels 131 (FIG. 20) are placed onto this tab which can be made from a PVC sheet. Currently, adhesive labels are applied directly to the adapter panel next to the corresponding adapter. Because of the size of the adapters, little room is available for labeling and the numbers become hard to read. Other known assignment tabs allow for numbers to be written; however, such tabs cannot be removed without disconnecting the fiber optic jumpers because the tab is placed around the adapters. The present assignment tab 130 is located only on one side of the adapters, thus allowing it to be removed without disturbing the connected fibers.

Referring to FIGS. 21 to 26, the rear splice modules are now described. A rear splice module 200 provides the capability to manage mass fusion (ribbon fiber) splicing in the rear compartment of the enclosure.

Standard enclosures address splicing by pre-stubbing the enclosure, that is, attaching a length of cable to the enclosure and pre-wiring the rear with the fiber. This allows installers to do less in the field, and limits the exposure of unprotected connectorized ends of cable. A problem with this method is that the length of cable needs to be known prior to installation and the route of installation needs to start at the intended location of the enclosure. It often times is easier to install raw cable as needed and place it into the enclosure when it is in place. Because it is extremely cumbersome and time consuming to connectorize and polish fiber optic connectors in the field, it is preferable to provide a pre-wired enclosure with pigtails with splicing of the cables to the pigtails.

In the past, an enclosure would be prewired for patching and a separate enclosure would be used to house the splices with the pigtails going between the two enclosures. As demand for optical fibers increases, so does the need to get as many fibers as possible into smaller spaces. This is one reason to consolidate and place the splices directly into the rear of the patch enclosure as provided in the present system. This also makes in plant manufacturing easier, avoiding the need to have the multiple fibers broken out, connectorized, and prewired into the enclosure. By connectorizing pigtails and splicing a cable onto them in the plant, the pigtails can be mass-produced at a different location. This allows for flexible manufacturing and possible reduction in cost and lead-time.

Figure 21:
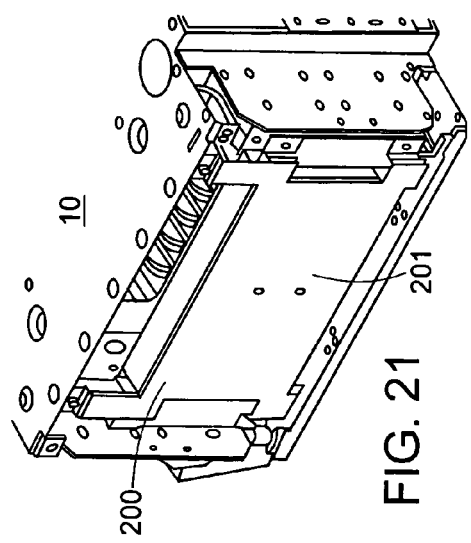
FIG. 21 is a rear perspective view of the enclosure of FIG. 1 with a fold down splice module in the closed position.
Figure 23:
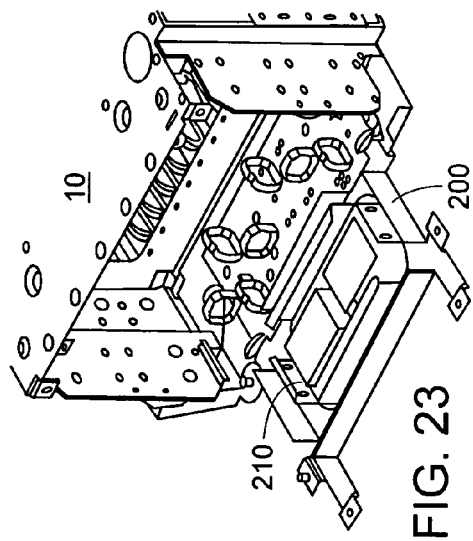
FIG. 23 is a rear perspective view of the enclosure of FIG. 1 with the fold down splice module in the opened position and cover removed.
Figure 26:
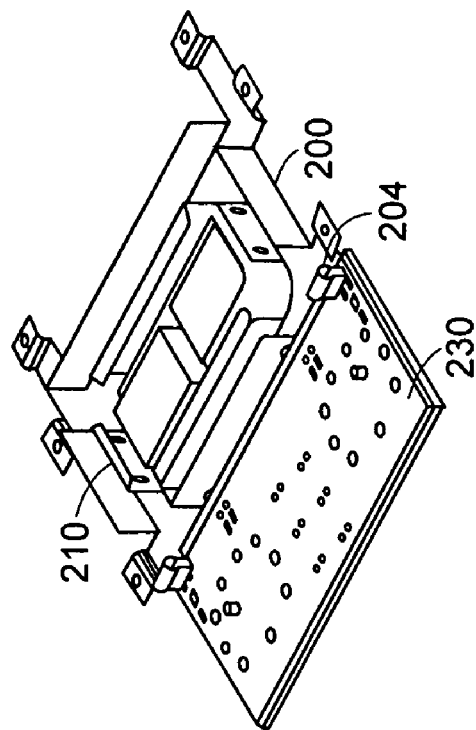
FIG. 26 is a front perspective view of the fold down splice module in the opened position and cover removed.
Figure 25:
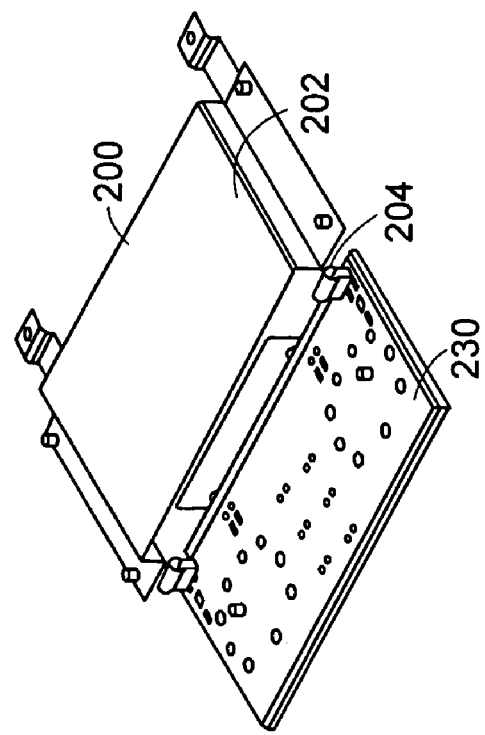
FIG. 25 is a front perspective view of the fold down splice module in the opened position.

The fold down splice module 200 mounts in place of the rear management plate. It includes a similar rear management plate 230 with hinges 204 on it, a door 201 that holds the splices or splice tray and manages fiber, and a cover 202 to protect the splices and managed fiber. In the closed position as shown in FIG. 21, the door 201 mounts vertically, directly inside the rear door and is attached to a rear management plate attached to the top of the housing. To open the splice door 201, the rear door is removed and the splice door is detached from the top rear plate. The splice door pivots on the hinges and comes to rest horizontally on the bottom of the housing. This makes the splices readily available and also allows for access to the rear of the patch connections.

The splices can be mounted directly to the splice door or mounted in a removable splice tray 210. A predetermined amount of slack is also managed by the splice door, allowing the splice to be removed for servicing. Pigtails (ribbon) are routed from the bottom rear management plate 230 and onto the splice door with enough slack to accommodate the pivoting of the door.

Figure 27:
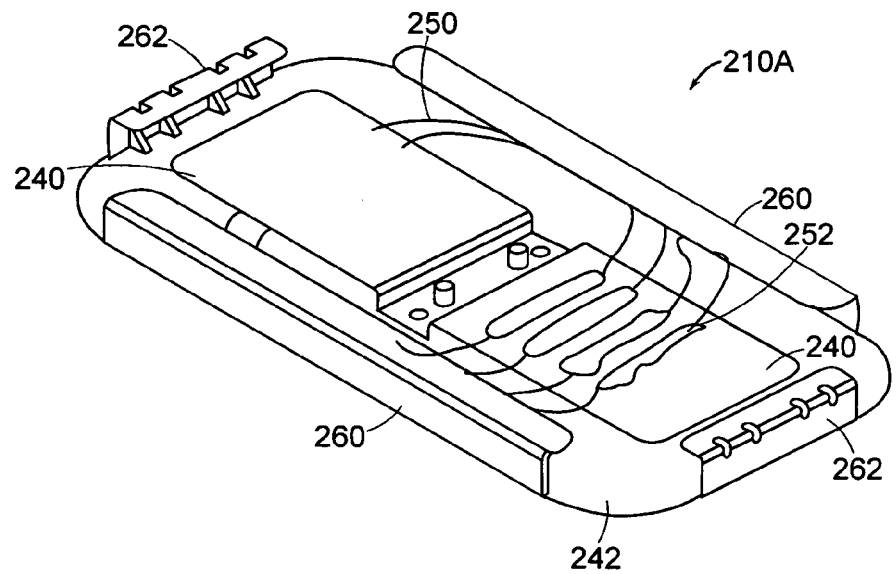
FIG. 27 is a perspective view of a first embodiment of a splice tray.
Figure 28:
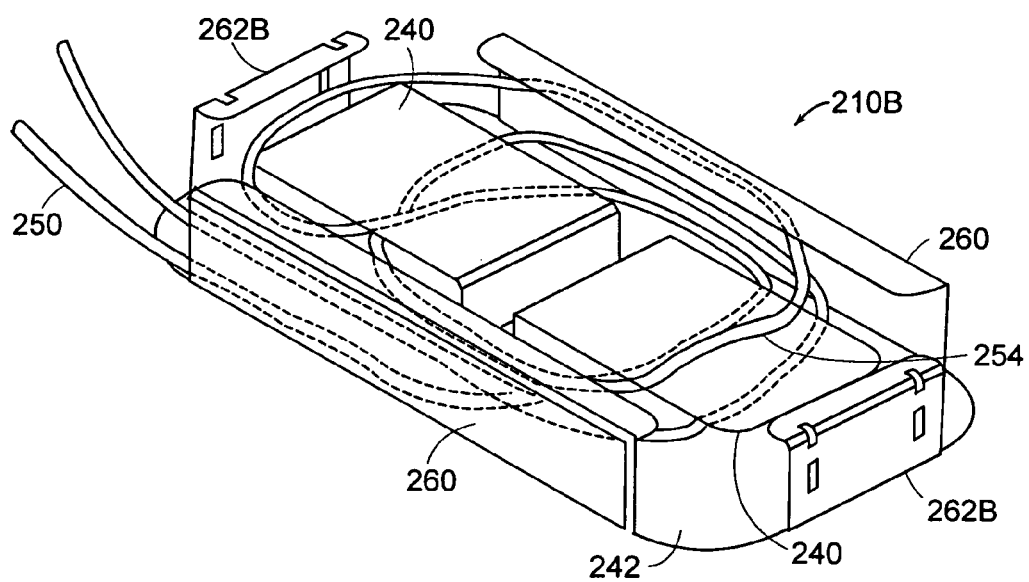
FIG. 28 is a perspective view of a second embodiment of a splice tray.
Figure 30:
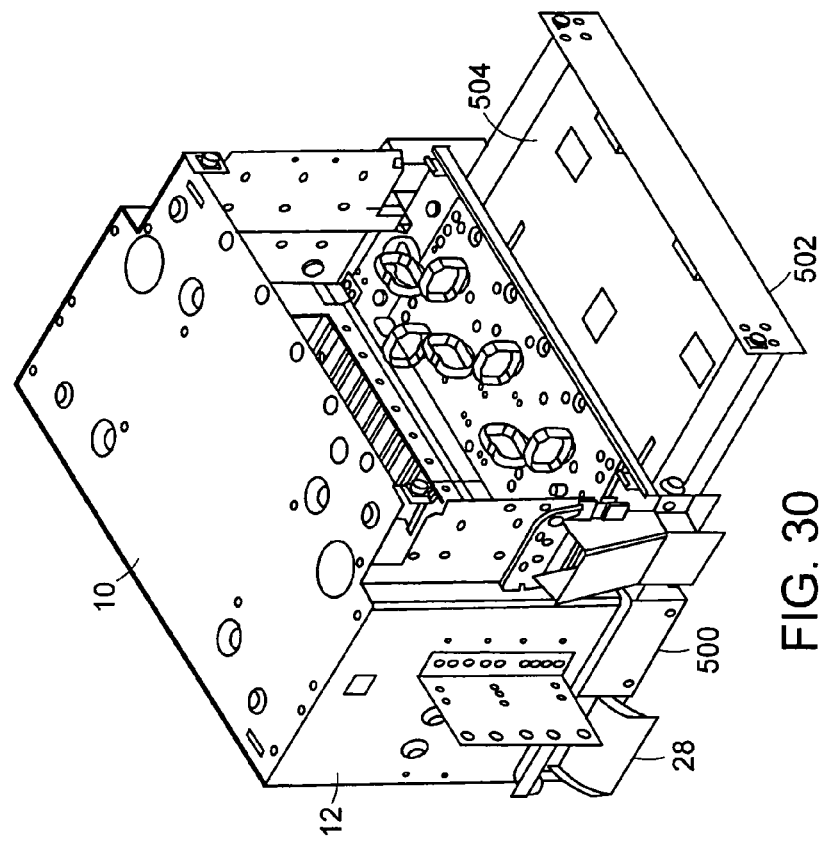
FIG. 30 is a rear perspective view of the enclosure of FIG. 1 with the drawer splice module in an opened position.
Figure 29:
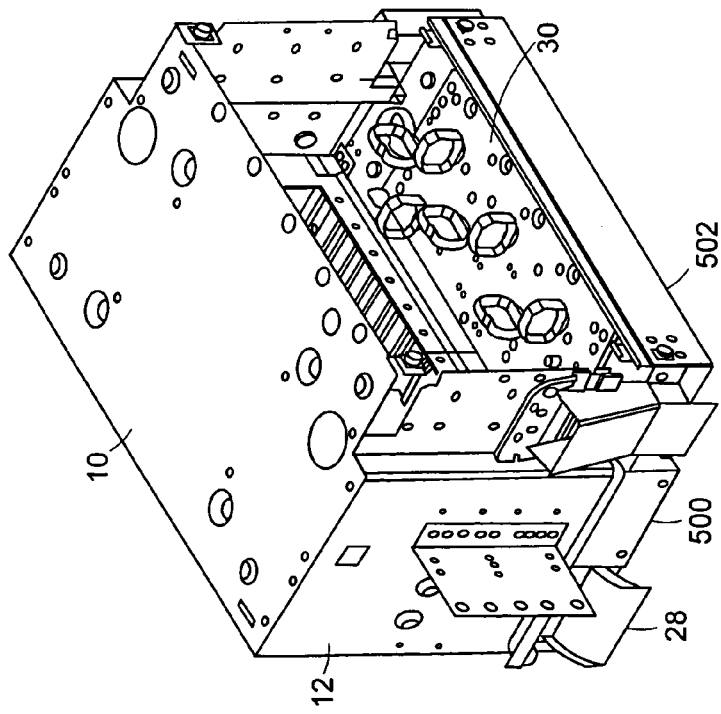
FIG. 29 is a rear perspective view of the enclosure of FIG. 1 with a drawer splice module in a closed position.
Figure 32:
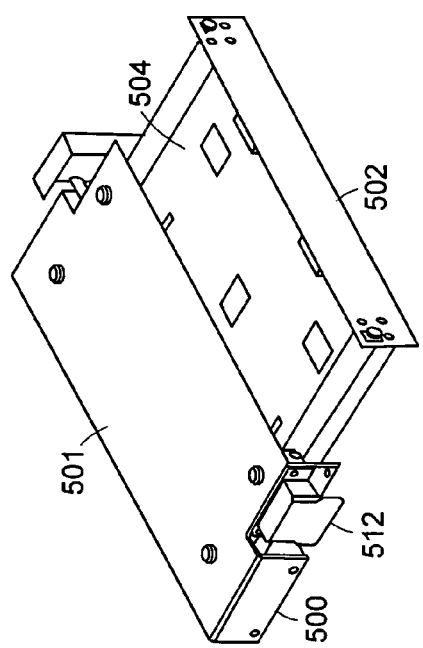
FIG. 32 is a top perspective view of the drawer splice module in the opened position.
Figure 34:
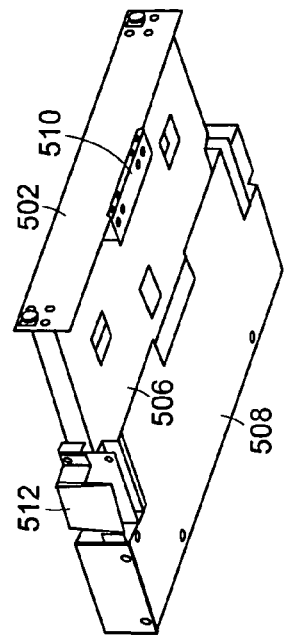
FIG. 34 is a bottom perspective view of the drawer splice module in the opened position.
Figure 31:
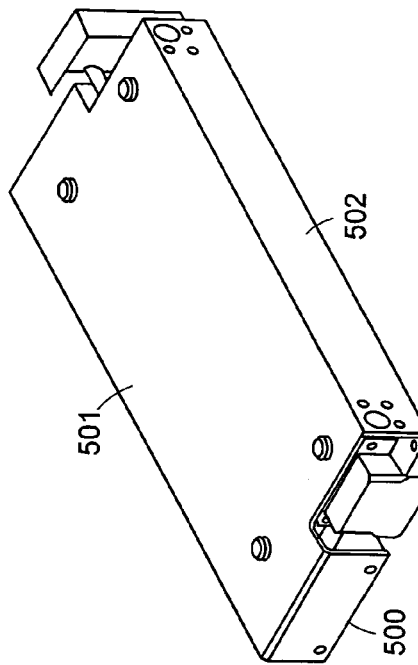
FIG. 31 is a top perspective view of the drawer splice module in the closed position.
Figure 33:
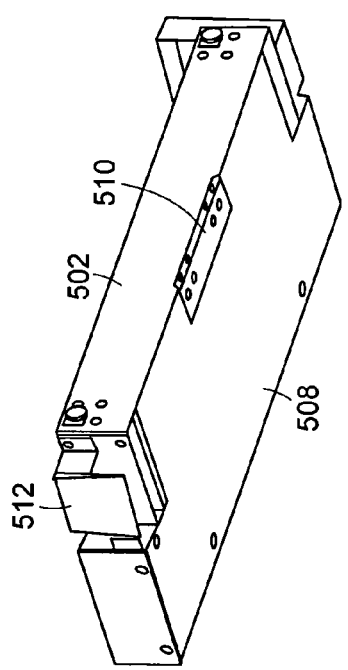
FIG. 33 is a bottom perspective view of the drawer splice module in the closed position.

Referring to FIGS. 27 and 28, the splice tray 210 is now described. Standard splice trays currently available essentially mount the splices to the floor of the tray and manage fiber slack loops around the splices. Trays have different levels of fiber management to store and protect the fibers. This method has some drawbacks. By managing the excess fiber around the splices and in specified management path, the length of the fiber needs to be correct or the fiber will bend or be pulled. To splice, an operator needs to cut the fiber to the specific length. Also, if a splice is done incorrectly, the fiber needs to cut back one complete loop to be the correct length again. Also, this method does not work well with ribbon fiber. Because ribbon fiber is thin and wide, it occupies a large amount of space when laid on top of each other. Having the ribbon mass fusion splices at the same level as the management loops is difficult to do because the ribbon usually needs to be routed over itself.

To avoid the above problems, a two layered splice tray is provided in the present system. The trays 210 include floor 242, sides 260, 262 and a pair of splice plates 240. The trays are made deeper and a second layer (splice plates 240) added to mount the splices to while allowing the management loops to go under the splices. This eliminated the need for accurate cut lengths while splicing and only needing to cut a small amount of fiber if the splice is done incorrectly. This also reduced the amount of fiber needing to be managed as the multiple loops placed for resplicing can be replaced with a smaller length. The splice tray 210A in FIG. 27 shows individual splices 252 for fiber 250. A doubly deep splice tray 210B to manage ribbon mass fusion splices 254 provides ample room to cross ribbons 250 over each other as shown in the embodiment of FIG. 28.

Referring now to FIGS. 29 to 36, a drawer splice module 500 is shown. The drawer splice module 500 includes a drawer that mounts under the rear management plate 30 (FIGS. 29 and 30) for holding the splices and managing fibers. The drawer can either be inside the enclosure or in a separate housing directly under and attached to the rear of the enclosure. In the embodiment shown, the drawer module 500 is contained in a separate housing (FIGS. 31 to 36) and includes a top plate 501, drawer 502, drawer floor 504, bottom plate 508, fiber cable ports 512, drawer pass-through ports 518 and cable pass-through plate 510.

The splices can be mounted directly to the splice drawer or mounted in a removable splice tray such as the splice tray described above with respect to FIGS. 27 and 28. A predetermined amount of slack can also be managed by the splice drawer, allowing the splice to be removed for servicing. Pigtails (ribbon) 900 are routed from the rear of the enclosure and into the splice drawer with enough slack to accommodate the sliding of the drawer. A recess 506 is provided by the offset bottom 508 to accommodate fiber storage. hi an alternate embodiment, the drawer can be placed directly under the rear management plate in a flat bottomed enclosure with the fibers routed into the drawer for splicing.

Placement of a drawer to accommodate splicing at the back of the cabinet, whether mounted external to the enclosure or located inside of the enclosure is an improvement over prior approaches.

Entrance of the optical fiber into the drawer through the ports 518 and the management of the slack needed to pull the drawer in and out is also improved. The biggest difficulty with utilizing a sliding drawer system with optical fiber is the necessity of slack, which allows the drawer to be pulled out. When the drawer is pushed back in, this slack needs to be managed and enough room needs to be allocated to prevent the fibers from being over bent or damaged.

Figure 36:
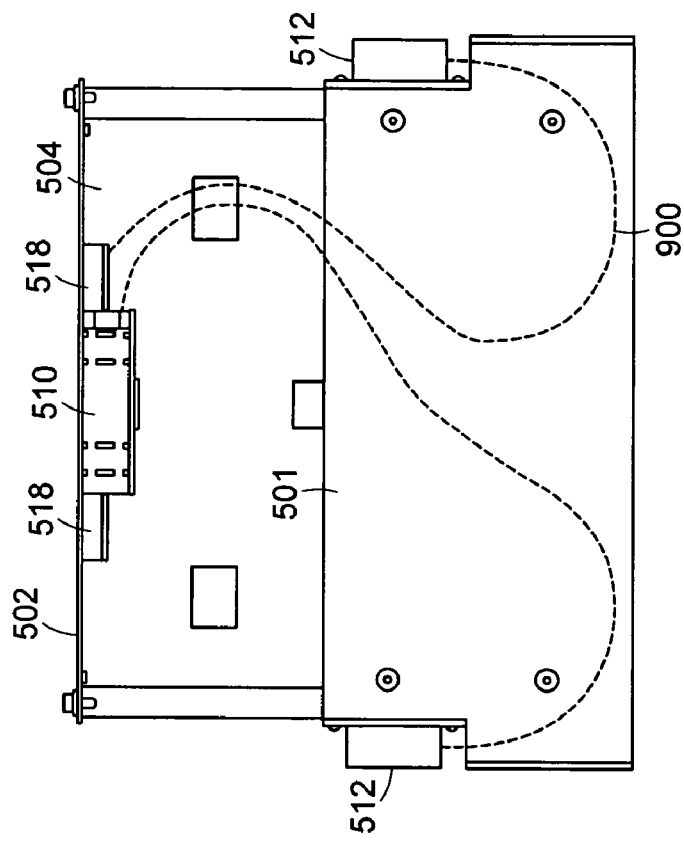
FIG. 36 is a top view of the drawer splice module in the opened position.
Figure 35:
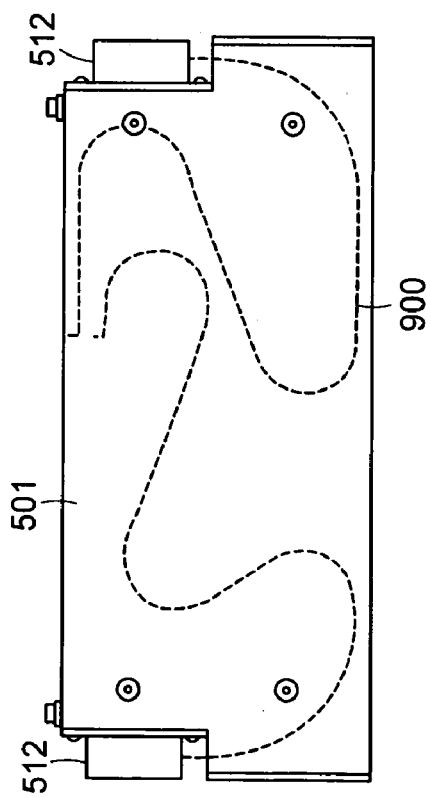
FIG. 35 is a top view of the drawer splice module in the closed position.

The system shown in FIGS. 29 to 36 provides a configuration which routes the slack fiber directly under the drawer itself and enters the drawer in the front. The space under the drawer is used to store the slack fiber in a "S" bend for fiber 900 as shown in FIGS. 35 and 36. As the drawer is pulled out, the "S" bend elongates and as the drawer is pushed back in, the "S" bend compresses. The "S" bend is configured to prevent the fiber from becoming over bent. As shown, fibers enter the storage space from both sides. In an alternate embodiment, all fibers can enter the storage space from the same side.

There are many different types of fiber optic adapters. Some adapters mount using a threaded body and a nut while others use flanges and screws. A few snap into thin panels; however, to remove them requires squeeze tabs on the rear of the adapter, and this is not useful when rear access is not possible.

The present approach provides a tab system of snapping adapters into a thin panel, which is removable from the front side of the panel. The improvement includes the incorporation of disengagable snaps directly into the plastic adapter body.

A first embodiment of a removable adapter is shown in FIGS. 37A and 37B. The adapter 600, preferably made of plastic, includes a body 602, connector recesses 604, engagement member 605 and location bosses 612. The engagement member 605 includes a hinge 610, finger tab 606 and engagement tang or tab 608. FIGS. 38A and 38B show the adapter 600 with connector pigtails 620A, 620B mounted to the recesses 604.

Figure 39B:
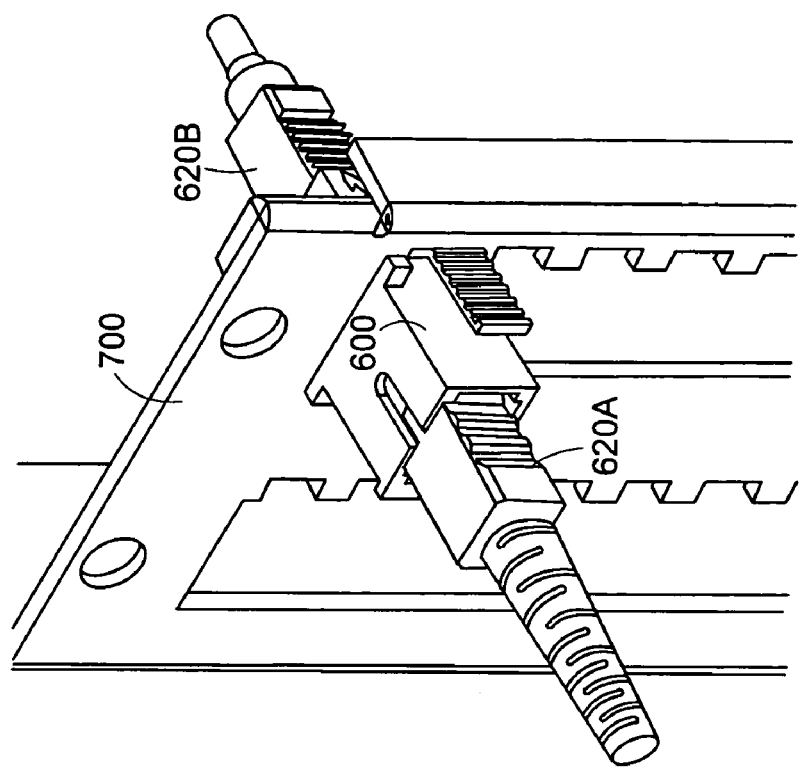
FIGS. 39A and 39B illustrate perspective views of the adapter of FIGS. 37A, 37B and FIGS. 38A, 38B, respectively, mounted to an adapter panel.
Figure 39A:
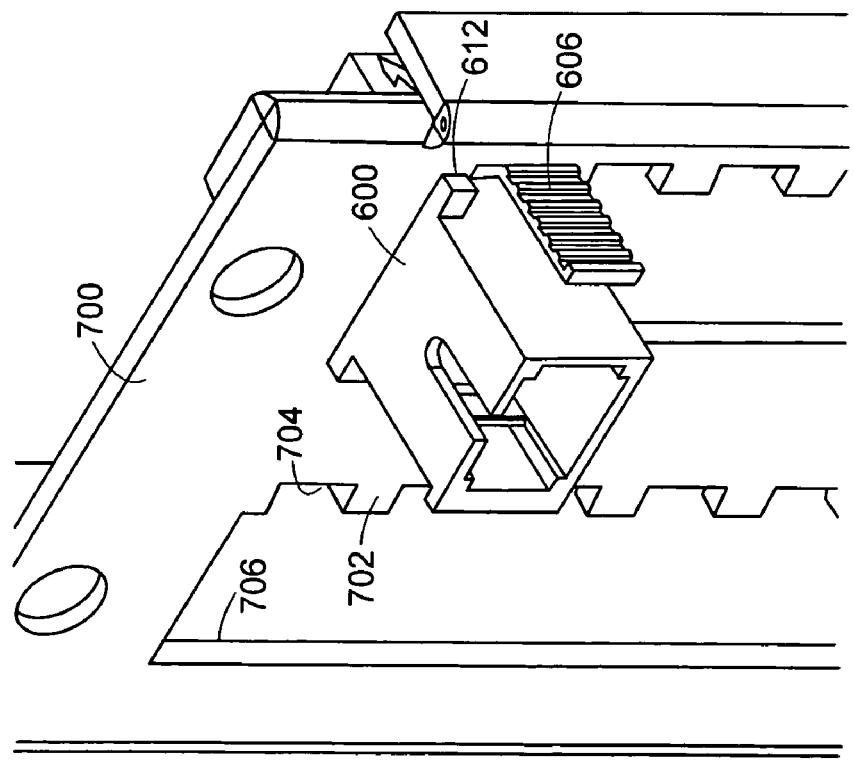

As shown in FIGS. 39A and 39B, the adapter can be mounted to an adapter panel 700. The panel has a cutout 706 that includes a plurality of slots 704 on the right side. The finger tab 606 sits in the slot 704 and the engagement tang snaps into the slot for holding the adapter in place in the panel. The adapter is disengaged by squeezing the finger tab 606 and removing the adapter from the slot.

Figure 40B:
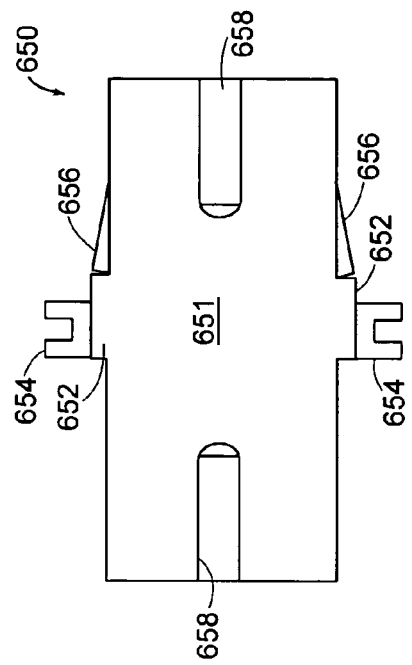
FIGS. 40A and 40B illustrate a second embodiment of a removable adapter.
Figure 41B:
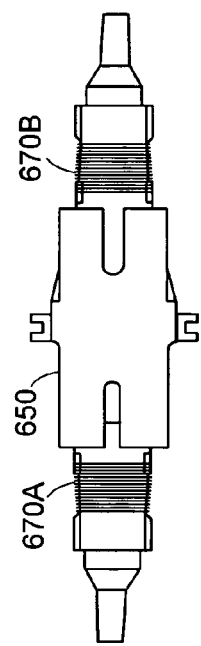
FIGS. 41A and 41B illustrate perspective and plan views, respectively, of the removable adapter of FIGS. 40A, 40B having pigtail connectors engaged with the adapter.
Figure 40A:
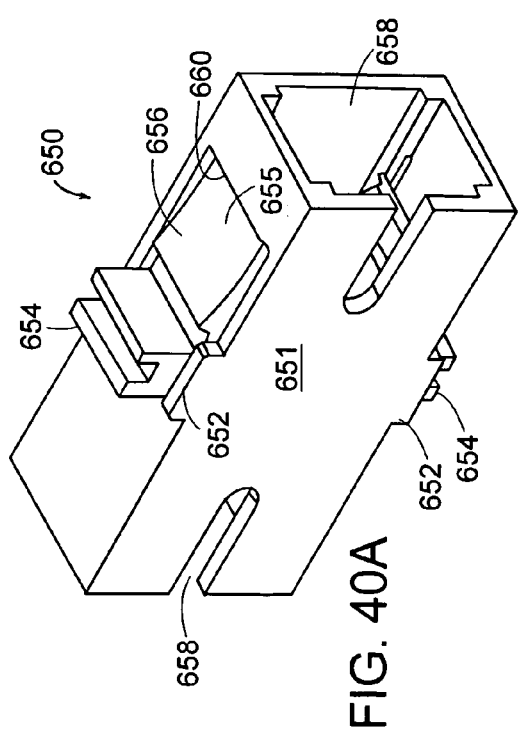
Figure 41A:
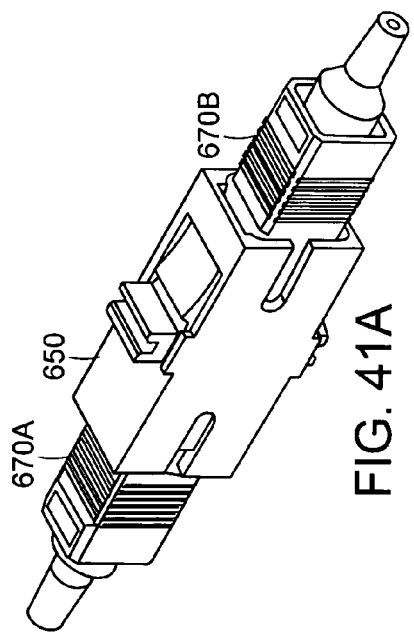

A second embodiment of a removable adapter is shown in FIGS. 40A and 40B. The adapter 650, preferably made of plastic, includes a body 652, connector recesses 658, engagement members 655 and location bosses 652. The engagement member 655 is partially recessed into the body 652 and includes a hinge 660, tab 654 and engagement tang or tab 656. FIGS. 41A and 41B show the adapter 650 with connector pigtails 670A, 670B mounted to the recesses 658.

Figure 43:
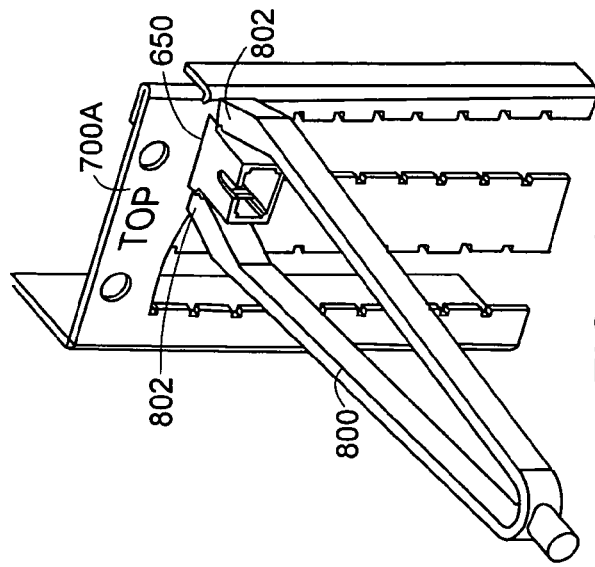
FIG. 43 illustrates extraction of the adapter from the panel using an extraction tool in accordance with a preferred embodiment of the present invention.
Figure 42:
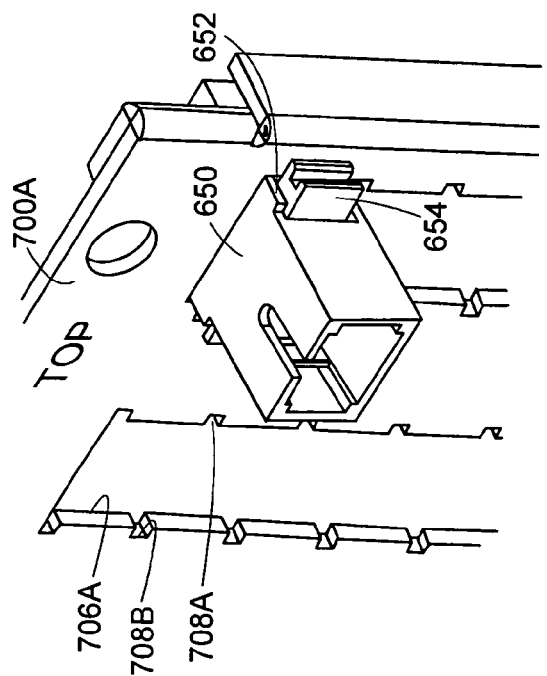
FIG. 42 illustrates a perspective view of the adapter of FIGS. 40A, 40B mounted to an adapter panel.

As shown in FIG. 42, the adapter can be mounted to an adapter panel 700A. The panel has a cutout 706A that includes a plurality of slots 708a, 708B on the left and right sides, respectively. The engagement tangs 656 snap into the slots for holding the adapter in place in the panel. The adapter is disengaged by squeezing the two tabs 654 inwardly using tool 800 (FIG. 43) to depress the engagement tangs 656 and remove the adapter from the slot. To prevent the adapters from sliding into each other when deployed in aggregates, the cutouts in the corresponding panel are notched. This notch engages either the tab itself or a protrusion in the adapter.

It should be understood that embodiments of the adapter can be modified to fit SC, LC, MT, MTRJ and any other adapter style.

Figure 44:
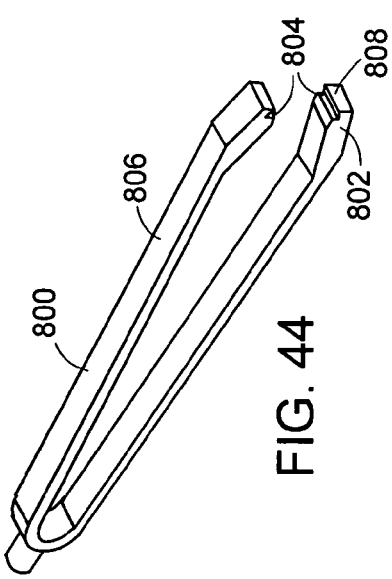
FIG. 44 illustrates the extraction tool in accordance with a preferred embodiment of the present invention.

The tool 800 (FIG. 44) includes a body 806 and a pair of fingers 802 which are placed on either side of the adapter. Protrusions 808 and recesses 804 in the tool fingers engage in corresponding recesses and protrusions in the removable adapter. The tool allows the engagement area on the tab of the adapter to be smaller and therefore reduce the footprint of the adapter.

The adapters can be used in the cassette embodiments described above. When removing the adapters, the connector on the rear side of the adapter are made accessible. By allowing the connectors to be accessed and removed through the front of the cassette, the rear of the cassette becomes free to use for fiber management.

While this invention has been particularly shown and described with references to preferred embodiments thereof, it will be understood by those skilled in the art that various changes in form and details may be made therein without departing from the scope of the invention encompassed by the appended claims.

What is claimed:

1. An optical fiber enclosure, comprising:
   a housing having a front compartment, a rear compartment, a first and a second side and a bulkhead having an essentially planar surface, the surface having openings disposed thereon for receiving at least a portion of a fiber cassette;
   a plurality of removable optical fiber cassettes having a front portion and a rear portion, the front portion further having a plurality of adapters associated therewith, each adapter having an adapter plug for providing optical connectivity without requiring removal of the cassette from the bulkhead, the rear portion having a plurality of optical fibers and fanouts associated therewith for facilitating optical coupling thereto; and
   at least one splice module for holding splices, the at least one splice module hingedly mounted to the enclosure to facilitate access to the splices when the splice module is in an open position relative to the enclosure, the at least one splice module further having a management plate hingedly mounted to the at least one splice module.

2. The optical fiber enclosure of claim 1 further comprising a plurality of optical fiber splices mounted to the splice module.

3. The optical fiber enclosure of claim 1 wherein the splice module includes a removable splice tray for mounting optical fiber splices and for managing associated slack fiber loops around the splices.

4. The optical fiber enclosure of claim 1 further comprising at least one reversible fiber radius guide mounted to the housing.

5. The optical fiber enclosure of claim 1 further comprising at least one removable panel mounted to the bulkhead.

6. The optical fiber enclosure of claim 1 further comprising at least one port on a top surface and a bottom surface of the first and second side for fiber management.

7. A splice module for use within a fiber optic enclosure for facilitating the coupling of optical signals, the splice module comprising:

a management plate adaptively configured for placement in a rear portion of the enclosure;

a hingedly joined splice door for holding fiber optic splices associated with optical signals flowing through at least one of a fiber optic adapter having a fiber optic connector associated therewith, the fiber optic adapter and connector further being associated with a removable fiber optical cassette located within the enclosure, where the hingedly joined splice door is pivotally supported on the management plate to facilitate access to the fiber optic splices when the hingedly joined splice door is in an open configuration at the rear portion of the enclosure; and a removable cover for protecting the fiber optic splices when proximate to the splice door.

8. The splice module of claim 7 wherein the splice door includes a removable splice tray for mounting optical fiber splices and for managing associated slack fiber loops around the splices.

9. The splice module of claim 7 further comprising a plurality of optical fiber splices mounted to the splice door.

10. An optical fiber enclosure, comprising:

a housing having a front compartment, a rear compartment, a first and a second side and a bulkhead, the bulkhead defining openings sized to receive at least a portion of a fiber cassette;

a plurality of removable optical fiber cassettes having a front portion and a rear portion, the front portion having a plurality of adapters associated therewith, each adapter having an adapter plug for providing optical connectivity without requiring removal of the cassette from the bulkhead, the rear portion having a plurality of optical fibers and fanouts associated therewith for facilitating optical coupling thereto; and at least one splice module configured to hold splices, the at least one splice module hingedly mounted to the enclosure so that in use the at least one splice module pivots about a horizontal axis from a closedposition, wherein the splice module blocks access to the rear compartment of the housing, to an open position, wherein the splice module allows access to the rear compartment of the housing.

11. The optical fiber enclosure of claim 10, wherein the bulkhead has a substantially planar surface and the at least one splice module is oriented substantially parallel to the bulkhead when the splice module is in the closed position.

12. The optical fiber enclosure of claim 10, wherein the bulkhead has a substantially planar surface and the at least one splice module is oriented substantially perpendicular to the bulkhead when the splice module is in the open position.

13. The optical fiber enclosure of claim 10, wherein the at least one splice module has a major surface configured to block access to the rear compartment of the housing when the splice module is in the closed position, the major surface being further configured to enable access to the rear compartment of the housing when the splice module is in the open position.

* * * * *

UNITED STATES PATENT AND TRADEMARK OFFICE
CERTIFICATE OF CORRECTION

PATENT NO. : 7,068,907 B2
APPLICATION NO. : 11/007673
DATED : June 27, 2006
INVENTOR(S) : Schray Page 1 of 1

It is certified that error appears in the above-identified patent and that said Letters Patent is hereby corrected as shown below:

Col. 1, line 42: "remains a Continuing need" should read --remains a continuing need--

Col. 12, line 13, claim 10: "from a closedposition," should read --from a closed position,--

Signed and Sealed this

Sixth Day of February, 2007

JON W. DUDAS
*Director of the United States Patent and Trademark Office*